United States Patent
Sun et al.

(10) Patent No.: US 10,694,531 B2
(45) Date of Patent: Jun. 23, 2020

(54) GROUPING USER EQUIPMENT BASED ON PRECODING MATRIX INDICATORS FOR COMBINED TRANSMISSION

(71) Applicant: QUALCOMM Incorporated, San Diego, CA (US)

(72) Inventors: Jing Sun, San Diego, CA (US); Peter Gaal, San Diego, CA (US); Wanshi Chen, San Diego, CA (US); Juan Montojo, San Diego, CA (US); Hao Xu, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 123 days.

(21) Appl. No.: 15/478,173

(22) Filed: Apr. 3, 2017

(65) Prior Publication Data

US 2017/0332389 A1    Nov. 16, 2017

Related U.S. Application Data

(60) Provisional application No. 62/336,036, filed on May 13, 2016.

(51) Int. Cl.
| | | |
|---|---|---|
| *H04W 72/04* | (2009.01) | |
| *H04W 72/12* | (2009.01) | |
| *H04B 7/0452* | (2017.01) | |
| *H04B 7/0456* | (2017.01) | |
| *H04J 99/00* | (2009.01) | |
| *H04W 72/08* | (2009.01) | |

(52) U.S. Cl.
CPC ........ *H04W 72/121* (2013.01); *H04B 7/0452* (2013.01); *H04B 7/0456* (2013.01); *H04J 15/00* (2013.01); *H04W 72/046* (2013.01); *H04W 72/048* (2013.01); *H04W 72/082* (2013.01)

(58) Field of Classification Search
None
See application file for complete search history.

(56) References Cited

U.S. PATENT DOCUMENTS

2009/0006925 A1* 1/2009 Pan ..................... H04L 1/1861
714/758
2010/0103832 A1    4/2010 Zhou et al.
(Continued)

OTHER PUBLICATIONS

International Search Report and Written Opinion—PCT/US2017/025915—ISA/EPO—dated Jun. 30, 2017.

*Primary Examiner* — Duc T Duong
(74) *Attorney, Agent, or Firm* — Arent Fox, LLP

(57) ABSTRACT

The present disclosure enables a base station to group UEs based on similar PMIs for a combined transmission. The apparatus may receive a plurality of PMIs from a plurality of UEs. In one aspect, each PMI in the plurality of PMIs may be received from a different UE. The apparatus may also assign each UE of the plurality of UEs to a UE group. In another aspect, each UE group may be associated with a different PMI set in a plurality of PMI sets. The apparatus may further assign a transmission scheme to each UE group. In one configuration, the apparatus may determine one or more preferred spatial layers for each UE (e.g., based on the PMIs) assigned to a UE group, and schedule a combined transmission for the UE group based on the determined one or more spatial layers.

32 Claims, 8 Drawing Sheets

(56) References Cited

U.S. PATENT DOCUMENTS

| | | | |
|---|---|---|---|
| 2011/0200131 A1* | 8/2011 | Gao | H04B 7/0452 375/267 |
| 2012/0122468 A1* | 5/2012 | Gao | H04B 7/026 455/452.1 |
| 2012/0213169 A1* | 8/2012 | Wang | H04B 7/04 370/329 |
| 2013/0315189 A1* | 11/2013 | Kim | H04L 1/0026 370/329 |
| 2014/0086190 A1* | 3/2014 | Shimanuki | H04B 7/0478 370/329 |
| 2014/0185478 A1* | 7/2014 | Kuo | H04B 7/0626 370/252 |
| 2014/0355702 A1* | 12/2014 | Thomas | H04L 5/0032 375/267 |
| 2015/0312074 A1 | 10/2015 | Zhu et al. | |
| 2016/0050000 A1* | 2/2016 | Zhang | H04B 7/0417 375/267 |
| 2016/0056875 A1* | 2/2016 | Kang | H04B 7/0456 370/329 |
| 2016/0128025 A1* | 5/2016 | Zhang | H04J 11/005 370/329 |
| 2016/0150512 A1* | 5/2016 | Zhang | H04B 7/024 370/329 |
| 2016/0353424 A1* | 12/2016 | Stirling-Gallacher | H04B 7/0626 |
| 2017/0181153 A1* | 6/2017 | Choi | H04B 7/0417 |
| 2017/0244519 A1* | 8/2017 | Yang | H04L 1/0026 |
| 2017/0317722 A1* | 11/2017 | Lange | H04B 7/022 |
| 2018/0019852 A1* | 1/2018 | Soldati | H04W 4/08 |
| 2018/0063856 A1* | 3/2018 | Yang | H04W 72/12 |

* cited by examiner

GROUPING USER EQUIPMENT BASED ON PRECODING MATRIX INDICATORS FOR COMBINED TRANSMISSION

CROSS-REFERENCE TO RELATED APPLICATION

This application claims the benefit of U.S. Provisional Application Ser. No. 62/336,036, entitled "GROUPING USER EQUIPMENT BASED ON PRECODING MATRIX INDICATORS FOR COMBINED TRANSMISSION" and filed on May 13, 2016, which is expressly incorporated by reference herein in its entirety.

BACKGROUND

Field

The present disclosure relates generally to communication systems, and more particularly, to grouping user equipments (UEs) based on precoding matrix indicators (PMIs) for a Multiuser (MU) Superposition Transmission (MUST).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

MUST is a joint optimization of MU operation from the perspective of both the UE and the base station that may improve system capacity even if the transmission and/or precoding is non-orthogonal. Current MUST operation may not enable a combined transmission (e.g., a MUST) that uses the preferred spatial layers of each UE receiving the combined transmission. There is a need to determine a transmission scheme that uses the preferred spatial layers of each UE receiving a combined transmission.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

MUST is a joint optimization of MU operation from the perspective of both the UE and the base station that may improve system capacity even if the transmission and/or precoding is non-orthogonal. Current MUST operation may not enable a combined transmission that uses the preferred spatial layers of each UE receiving the combined transmission. There is a need to determine a transmission scheme that uses the preferred spatial layers of each UE receiving the combined transmission.

The present disclosure provides a solution to the problem by enabling a base station to group UEs based on similar PMIs for MUST transmissions. For example, a base station may determine one or more preferred spatial layers for each UE (e.g., based on the PMIs) assigned to a UE group, and schedule a combined transmission for the particular UE group based on the determined preferred spatial layers. Hence, the base station of the present disclosure may determine a transmission scheme that uses the preferred spatial layers of each UE receiving the combined transmission.

In an aspect of the disclosure, a method, a computer-readable medium, and an apparatus are provided. The apparatus may receive a plurality of PMIs from a plurality of UEs. In one aspect, each PMI in the plurality of PMIs may be received from a different UE. The apparatus may also assign each UE of the plurality of UEs to a UE group. In another aspect, each UE group may be associated with a different PMI set in a plurality of PMI sets. The apparatus may further assign a transmission scheme to each UE group. The apparatus may also transmit a combined transmission to a first UE group. In one aspect, the combined transmission may be based at least in part on the transmission scheme assigned to the first UE group.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
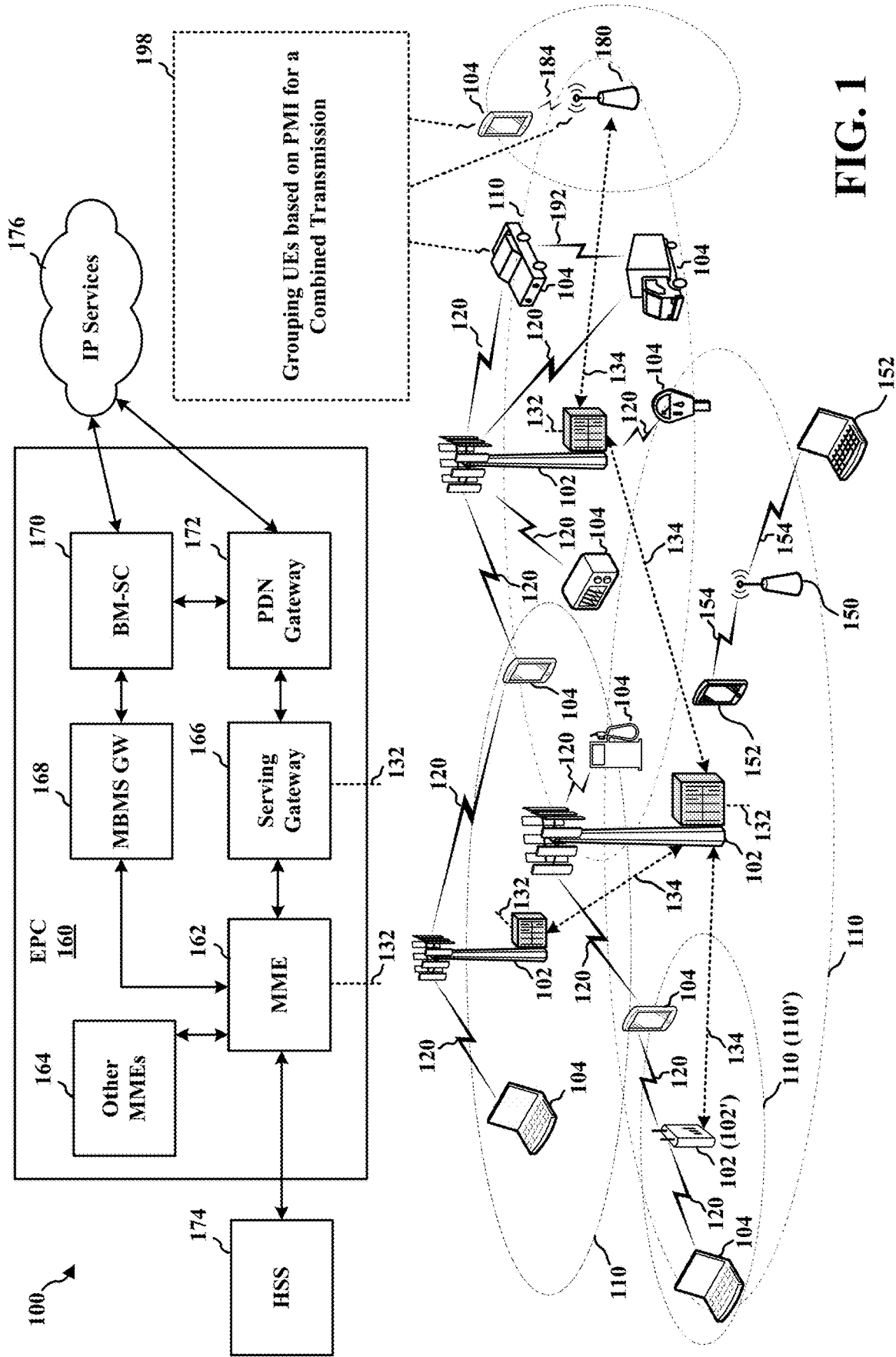
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may wirelessly communicate with each other using device-to-device (D2D) communication link 192. D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the eNB 102/base station 180 may be configured to group UEs based on PMI for a combined transmission (198).

Figure 2:
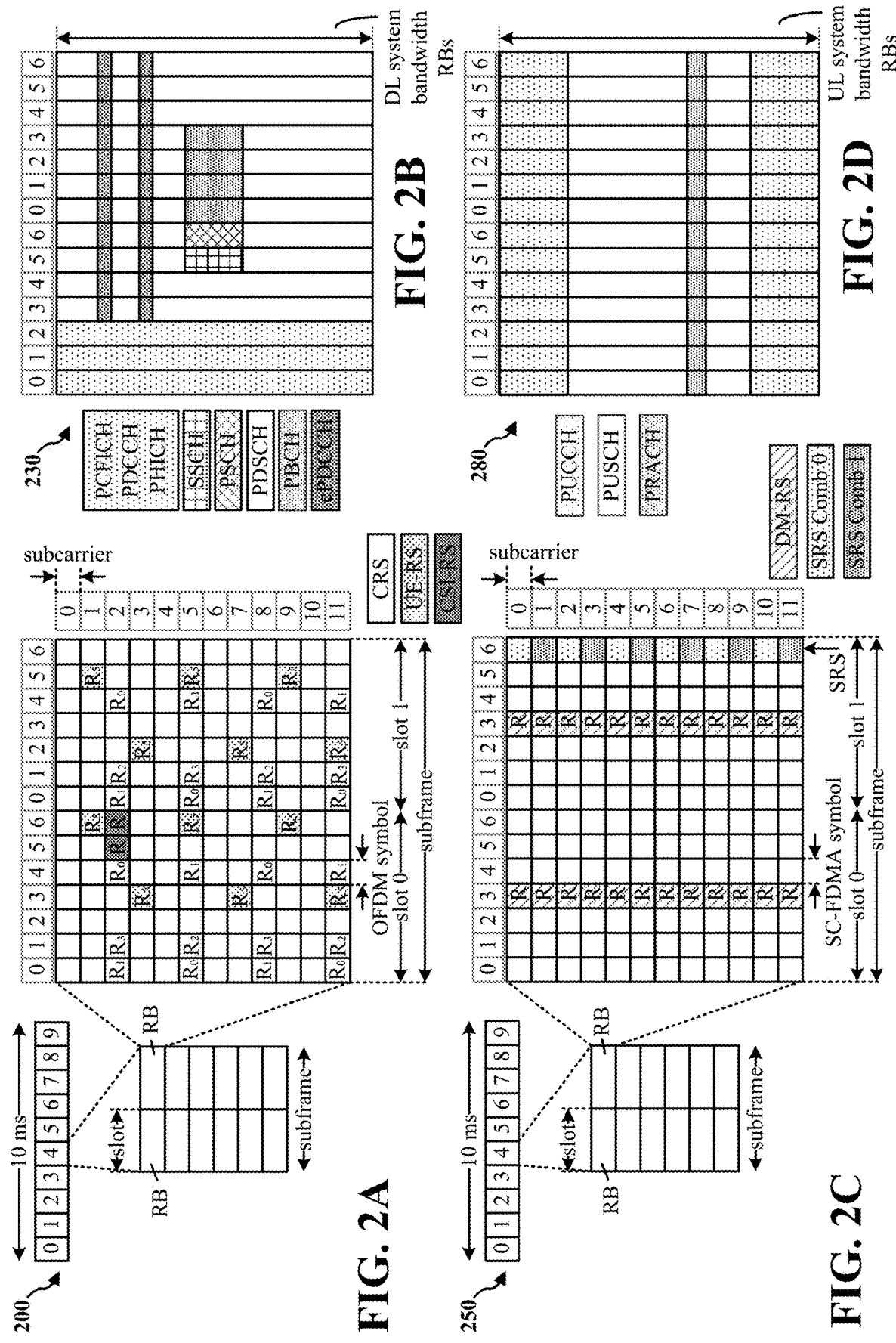
FIGS. 2A, 2B, 2C, and 2D are diagrams illustrating examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as R0, R1, R2, and R3, respectively), UE-RS for antenna port 5 (indicated as R5), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
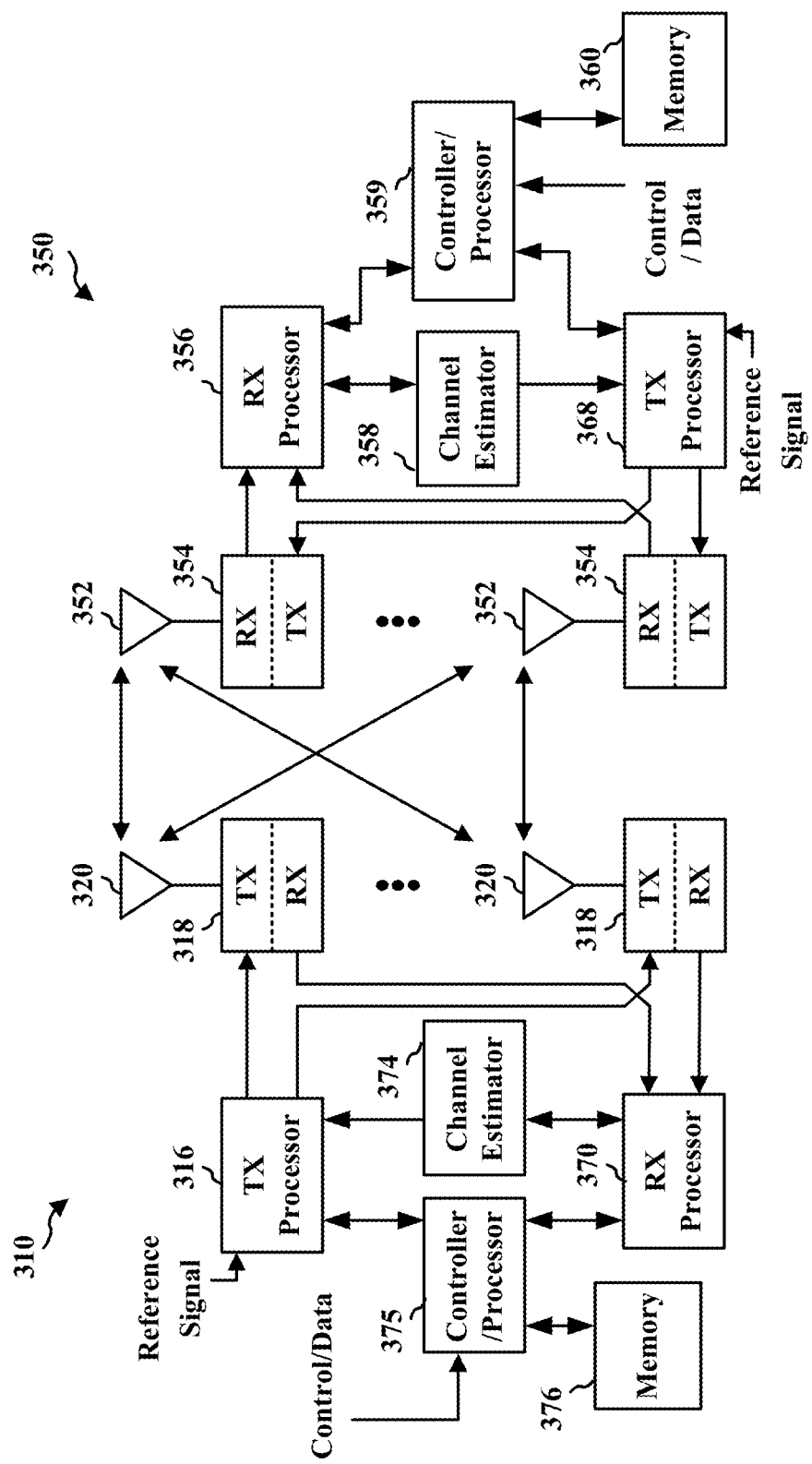
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

MUST is a joint optimization of MU operation from the perspective of both the UE and the eNB that may improve system capacity even if the transmission and/or precoding is non-orthogonal. Current MUST operation may not enable a combined transmission that uses the preferred spatial layers of each UE receiving the combined transmission. There is a need to determine a transmission scheme that uses the preferred spatial layers of each UE receiving the combined transmission.

The present disclosure provides a solution to the problem by enabling a base station to group UEs based on similar PMIs for MUST transmissions. For example, a base station may determine one or more preferred spatial layers for each UE (e.g., based on the PMIs) assigned to a UE group, and schedule a combined transmission for the particular UE group based on the determined preferred spatial layers. Hence, the base station of the present disclosure may determine a transmission scheme that uses the preferred spatial layers of each UE receiving the combined transmission.

Figure 4:
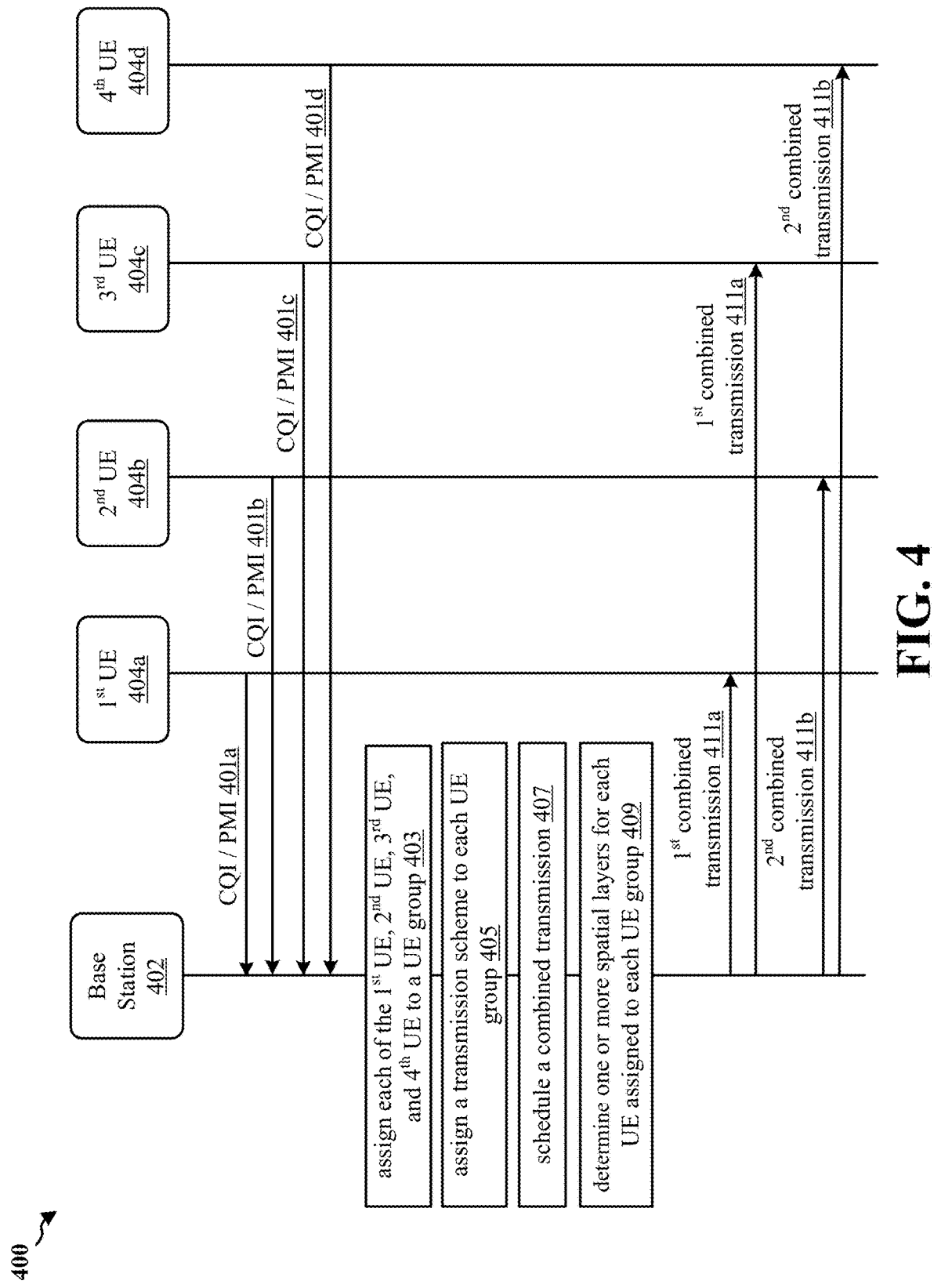
FIG. 4 is a diagram illustrating a data flow for a communication system(s) that may support MUST in accordance with certain aspects of the disclosure

FIG. 4 is a flow diagram 400 for sending one or more combined transmission(s) (e.g., MUST(s)) from a base station 402 to one or more of a first UE 404a, a second UE 404b, a third UE 404c, and/or a fourth UE 404d in accordance with certain aspects of the disclosure. In certain configurations, base station 402 may correspond to, e.g., base station 102, 180, eNB 310, apparatus 602/602'. First UE 404a may correspond to, e.g., UE 104, 350, 650, 655. Second UE 404b may correspond to, e.g., UE 104, 350, 650, 655. Third UE 404c may correspond to, e.g., UE 104, 350, 650, 655. Fourth UE 404d may correspond to, e.g., UE 104, 350, 650, 655. Although UEs 404a, 404c (e.g., a first UE group) and UEs 404b, 404d (e.g., a second UE group) are described infra with respect to FIG. 4, more or fewer UEs may be grouped into more or fewer than two UE groups without departing from the scope of the present disclosure.

In multiple access communication systems, UEs may use different codebooks for UL transmissions based on the number of transmit antennas (e.g., 2 transmit antennas (Tx), 4 Tx, and/or 8 Tx) at the UE and/or ranks (e.g., spatial layers) used by the UE for an UL transmission. For example, two codebooks (e.g., a first codebook for rank-1 transmissions and a second codebook for rank-2 transmissions) may be needed for a UE with two Tx.

For the 2 Tx codebook, there may be four entries for rank-1 transmissions and two entries for rank-2 transmission. For example, the 2 Tx codebook may be defined by the following two base precoding matrices:

$$\begin{bmatrix} 1 & 1 \\ 1 & -1 \end{bmatrix} \text{ and } \begin{bmatrix} 1 & 1 \\ j & -j \end{bmatrix}.$$

Referring to FIG. 4, when a UE 404a, 404b, 404c, 404d selects rank-2, the UE 404a, 404b, 404c, 404d may select one of the two base precoding matrices listed supra. However, when the UE 404a, 404b, 404c, and/or 404d selects rank-1, the UE 404a, 404b, 404c, 404d may select one of the 4 columns of the two base precoding matrices listed supra.

In a first example embodiment, when a 4 Tx codebook is used by a legacy UE, there may be sixteen PMIs for each of rank-1, rank-2, rank-3, and rank-4. In a second example embodiment, when a 4 Tx codebook is used by a non-legacy UE 404a, 404b, 404c, and/or 404d, there may be two hundred and fifty six PMIs for each of rank-1 and rank-2, but sixteen PMIs for each of rank-3 and rank-4.

As illustrated in FIG. 4, each of the UEs 404a, 404b, 404c, 404d may send a respective PMI 401a, 401b, 401c, 401d to base station 402. In certain aspects, the codebook structure may be used by UEs 404a, 404b, 404c, 404d to determine which PMI 401a, 401b, 401c, 401d to report to base station 402. In the first example embodiment discussed supra, for each PMI, the base precoding matrices for the four rank cases (e.g., rank-1, rank-2, rank-3, and rank-4) may be formed by the selection of columns of a base precoding matrix (e.g., constructed with Householder properties). Out of the sixteen base precoding matrices, five of the base precoding matrices may be independent in the sense that all other base precoding matrices are column permutations of these five. Therefore, the base station 402 may group the sixteen base precoding matrices into five bins (e.g., all base precoding matrices may be grouped in a bin may be column permutations of each other).

For example, the first bin (e.g., Bin 0) may include {PMI0, PMI2, PMI8, PMI10}. In an aspect, each of PMI0, PMI2, PMI8, and PMI10 may be permutations of each other. The second bin (e.g., Bin 1) may include {PMI1, PMI3, PMI9, PMI11}. In an aspect, each of PMI1, PMI3, PMI9, and PMI11 may be permutations of each other. The third bin (e.g., Bin 4) may include {PMI4, PMI6}. In an aspect, PMI4 and PMI6 may be permutations of each other. The fourth bin (e.g., Bin 5) may include {PMI5, PMI7}. In aspect, PMI5 and PMI7 may be permutations of each other. The fifth bin (e.g., Bin 12) may include {PMI12, PMI13, PMI14, PMI15}. In an aspect, PMI12, PMI13, PMI14, and PMI15 may be permutations of each other. In another aspect, each one of the five bins (e.g., Bin 0, Bin 1, Bin 4, Bin 5, and Bin 12) may not include full column permutations. In addition, Bin 4 and Bin 5 may be smaller than each of Bin 0, Bin 1, and Bin 12 because a construction of the base precoding matrices may not always be the same size.

Referring again to FIG. 4, the base station 402 may categorize PMIs into a plurality of PMI sets (e.g., {PMI0, PMI2, PMI8, PMI10}, {PMI1, PMI3, PMI9, PMI11}, {PMI4, PMI6}, {PMI5, PMI7}, and {PMI12, PMI13, PMI14, PMI15}). For example, the base station 402 may generate the PMI sets based on a structure of one or more precoding matrices. In an aspect, the structure may include an orthogonality of the one or more precoding matrices. In another aspect, the base station 402 may assign 403 each UE 404a, 404b, 404c, 404d to a UE group (e.g., Bin 0, Bin 1, Bin 4, Bin 5, and Bin 12) based on the PMI received from each UE 404a, 404b, 404c, 404d. For example, each UE group may be associated with one of the PMI sets. Still further, the base station 402 may assign 405 a transmission scheme (e.g., an orthogonal MU-MIMO transmission scheme and/or a non-orthogonal multiple access (NOMA) transmission scheme) to each UE group.

In other words, UEs that are in the same UE group (e.g., the same Bin) may be co-scheduled by the base station 402 for a combined transmission (e.g., MUST). The base station 402 may determine 40 one or more preferred spatial layers for each UE 404a, 404b, 404c, 404d based on the received PMIs. By determining the one or more preferred spatial layers for each UE 404a, 404b, 404c, 404d, the base station 402 may schedule 409 a combined transmission for the particular UE group based on spatial layers covered in the reported PMIs for UEs in the same UE group. To increase a chance of pairing, the base station 402 may use a bitmap (e.g., codebookSubSetRestriction bitmap) to reduce the number of UEs that fall into a particular UE group.

In an aspect, when a UE 404a, 404b, 404c, 404d reports rank-1 to the base station 402, a UE 404a, 404b, 404c, 404d may report one CQI 401a, 401b, 401c, 401d for a single spatial layer. When a UE 404a, 404b, 404c, 404d reports rank-2 or a rank higher than rank-2 (e.g., rank-3 or rank-4), the UE 404a, 404b, 404c, 404d may report two CQIs 401a, 401b, 401c, 401d (e.g., one for each codeword). The reported CQIs may be interpreted by the base station 402 as the SNR for a spatial layer if the codeword is rank-1, or the average SNR of two spatial layers if the codeword is rank-2. The association between a reported rank and CQI is illustrated below in Table 1.

TABLE 1

| Rank | CQI0 | CQI1 |
| --- | --- | --- |
| 1 | SNR of layer 1 | N/A |
| 2 | SNR of layer 1 | SNR of layer 2 |
| 3 | SNR of layer 1 | Average SNR of layer 2 and layer 3 |
| 4 | Average SNR of layer 1 and layer 2 | Average SNR of layer 3 and layer 4 |

In an aspect, one spatial layer in one PMI may be another spatial layer of a different PMI in the same UE group. Therefore, each UE 404a, 404b, 404c, 404d in a particular UE group may provide an SNR measure for a set of columns of the base precoding matrix. The base station 402 may use the reported SNRs to determine or approximately determine the SNR used for MCS determination when pairing UEs 404a, 404c and/or UEs 404b, 404d for a combined transmission.

By way of example, assume that the first UE 404a and the third UE 404c both report rank-1 with the same PMI (e.g., PMI1) but with different SNRs to the base station 402. The base station 402 may pair (e.g., a MUST pairing) the first UE 404a and the third UE 404c in a first UE group (e.g., Bin0) with one of the third UE 404c being designated as the "far" UE (e.g., MUST-far UE) and the first UE 404a being designated as the "near" UE (e.g., MUST-near UE) based on a distance from the base station 402. In addition, the base station 402 may determine a power ratio of the combined transmission for the first UE 404a and the third UE 404c. Given a power ratio for the MUST pairing, the SNR of the third UE 404c may be adjusted by the base station 402 to reflect the power loss to the first UE 404a, and the extra interference from the first UE 404a. The SNR of the first UE 404a may be adjusted by the base station 402 to reflect the power loss to the third UE 404c, while the extra interference from the third UE 404c may not need to be considered due to interference cancellation.

In addition, assume that the second UE 404b and the fourth UE 404d both report rank-2 with the same PMI (e.g., PMI3) but with different SNRs to the base station 402. The base station 402 may pair (e.g., a MUST pairing) the second UE 404b and the fourth UE 404d in a second UE group (e.g., Bin 1) with the fourth UE 404d being designated as the "far" UE (e.g., MUST-far UE) and the second UE 404b being designated as the "near" UE (e.g., MUST-near UE) based on a distance to the base station 402. In addition, the base station 402 may determine a power ratio of the combined transmission for the first UE 404a and the third UE 404c. Given a power ratio for the MUST pairing, the SNR of the fourth UE 404d may be adjusted by the base station 402 to reflect the power loss to the second UE 404b, and the extra interference from the second UE 404b. The SNR of the second UE 404b may be adjusted by the base station 402 to reflect the power loss to the fourth UE 404d, while the extra interference from the fourth UE 404d may be cancelled using interference cancellation. The SNRs for the UEs in each of the first UE group and the second UE group may be adjusted by the base station 402 with outer loop backoff and the adjusted SNRs may be used for MCS selection. In one aspect, the base station 402 may need to split the outer loop backoff for the MUST from outer loop single user mode because determining the MCS may involve various approximations by the base station 402.

For the pairing of UEs 404a, 404c and UEs 404b, 404d, the base station 402 may support both orthogonal pairing and non-orthogonal pairing. For example, orthogonal pairing may be used by the base station 402 to pair UEs 404a, 404c and/UEs 404b, 404d with the same or similar SNR levels that also use different columns of the same base precoding matrix. For example, orthogonal pairing may be used for high geometry UEs 404a, 404b, 404c, and/or 404d that do not request full rank or when the CQI difference between the two codewords is less than a threshold difference. In one aspect, the base station 402 may pair UEs 404a, 404c and UE 404b, 404d requesting different sets of spatial layers. Additionally and/or alternatively, the base station 402 may pair UEs 404a, 404c and UE 404b, 404d that request spatial layer sets that overlap. For example, the base station 402 may assign a common spatial layer to either the first UE 404a or the third UE 404c in the first UE group and/or the second UE 404b or the fourth UE 404d in the second group when the spatial layer sets requested by UEs in a UE group overlap.

Non-orthogonal pairing may be used by the base station 402 to group UEs with a large SNR difference (e.g., a high geometry UE and a low geometry UE). For example, the base station may pair UEs 404a, 404c and/or UEs 404b, 404d such that the requested spatial layer set of for the UE with the higher SNR in the UE group is a super set of the requested spatial layer set requested by the UE with the lower SNR in the UE group.

Still referring to FIG. 4, UEs 404a, 404c in the first UE group and UEs 404b, 404d in the second UE group may be paired by the base station 402 based on an orthogonal transmission scheme and/or non-orthogonal transmission scheme. The base station 402 may determine an MCS pair for different pairing of UEs in a particular UE group (e.g., when more than two UEs are included in a UE group) to select the best pairing option.

In one aspect, base station 402 may send a first combined transmission 411a to the first UE 404a and the third UE 404c (e.g., the two UEs paired in the first UE group). In another aspect, base station 402 may send a second combined transmission 411b to the second UE 404b and the fourth UE 404d (e.g., the two UEs paired in the first UE group).

Based on the foregoing, the present disclosure may enable a base station 402 to determine a transmission scheme that uses the preferred spatial layers of each UE 404a, 404c and/or UE 404b, 404d receiving the combined transmission.

Figure 5A:
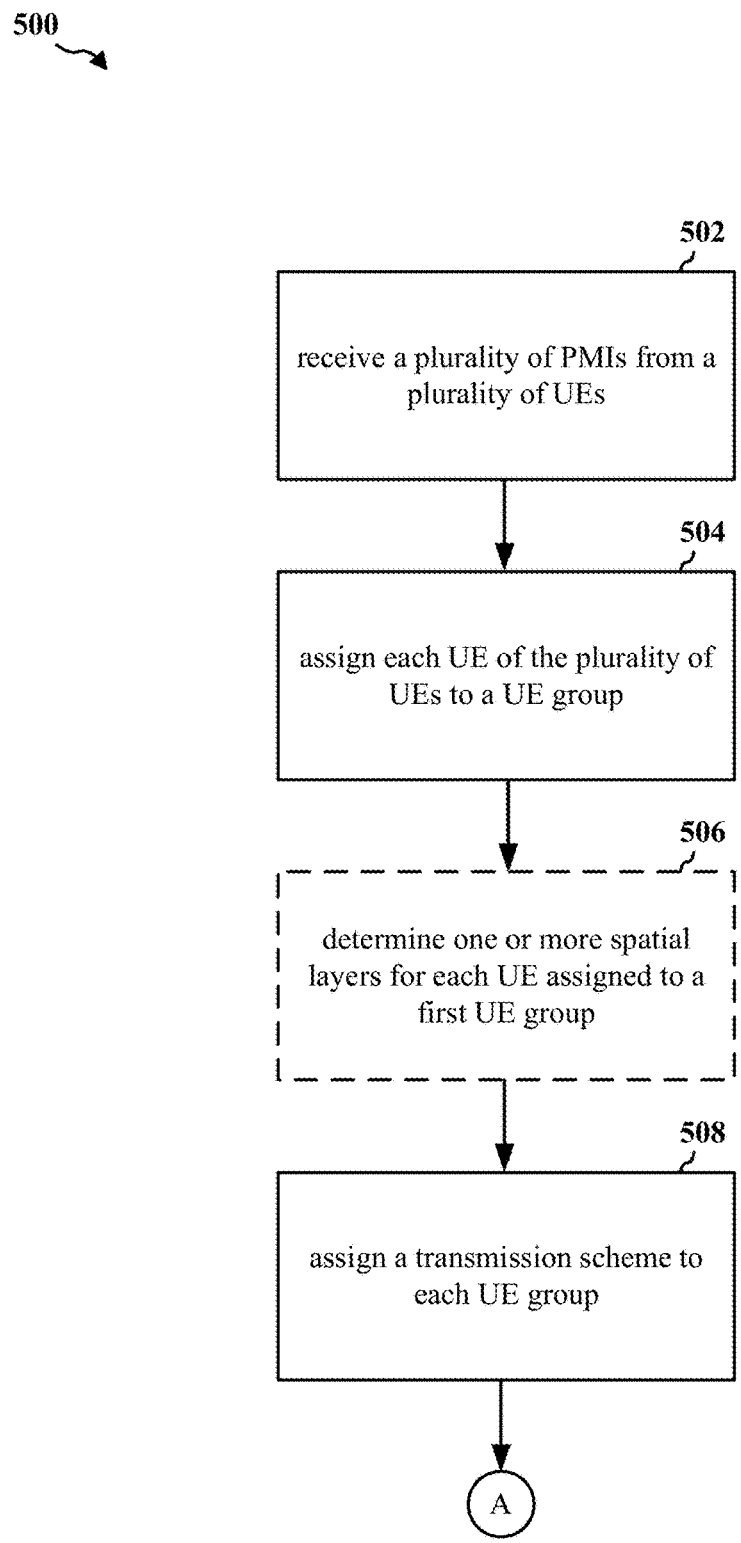
FIGS. 5A and 5B are a flowchart of a method of wireless communication.
Figure 5B:
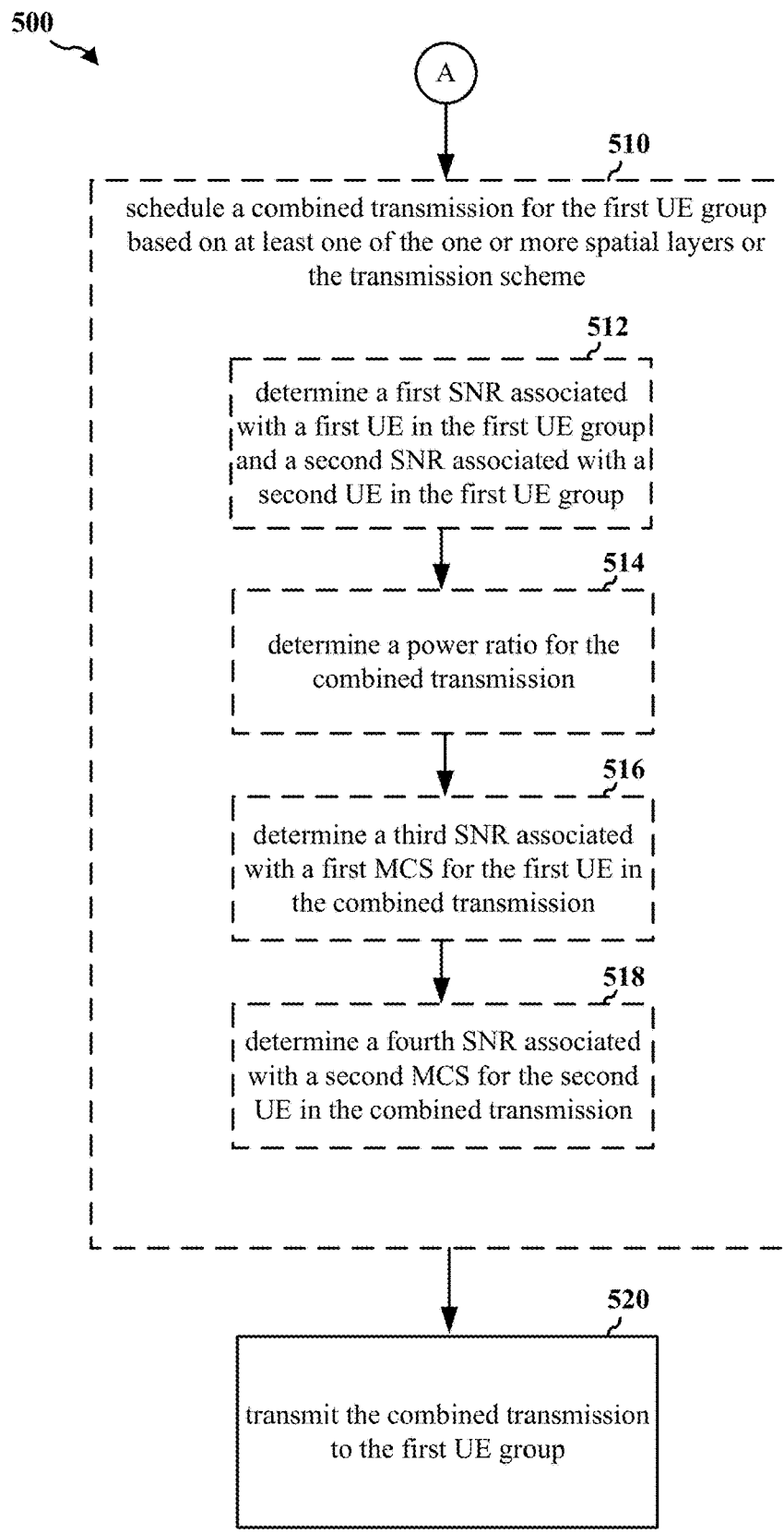

FIGS. 5A and 5B are a flowchart 500 of a method of wireless communication. The method may be performed by a base station (e.g., the base station 102, 180, eNB 310, apparatus 602/602') in communication with a plurality of UEs (e.g., the UE 104, 350, 404a, 404b, 404c, 404d, 650, 655). In FIGS. 5A and 5B, optional operations are indicated with dashed lines.

In FIG. 5A, at 502, the base station may receive a plurality of PMIs from a plurality of UEs. In one aspect, each PMI in the plurality of PMIs may be received from a different UE. For example, referring to FIG. 4, the base station 402 may receive a PMI 401a, 401b, 401c, 401d from the first UE 404a, the second UE 404b, the third UE 40c, and the fourth UE 404d, respectively.

In FIG. 5A, at 504, the base station may assign each UE of the plurality of UEs to a UE group. In one aspect, each UE group may be associated with a different PMI set in a plurality of PMI sets. In another aspect, the PMI sets may be associated with a structure of one or more precoding matrices. In a further aspect, the structure may include an orthogonality of the one or more precoding matrices. In another aspect, the plurality of PMI sets may be determined based on a priori information (e.g., predetermined information). For example, referring to FIG. 4, the base station 402 may categorize PMIs into a plurality of PMI sets (e.g., {PMI0, PMI2, PMI8, PMI10}, {PMI1, PMI3, PMI9, PMI11}, {PMI4, PMI6}, {PMI5, PMI7}, and {PMI12, PMI13, PMI14, PMI15}). For example, the base station 402 may generate the PMI sets based on a structure of one or more precoding matrices. In an aspect, the structure may include an orthogonality of the one or more precoding matrices. The base station 402 may assign 403 each UE 404a, 404b, 404c, 404d to a UE group (e.g., Bin 0, Bin 1, Bin 4, Bin 5, and Bin 12) based on the PMI received from each UE 404a, 404b, 404c, 404d. For example, each UE group may be associated with one of the PMI sets.

In FIG. 5A, at 506, the base station may determine one or more spatial layers for each UE assigned to a first UE group. For example, referring to FIG. 4, the base station 402 may determine 407 one or more preferred spatial layers for each UE 404a, 404b, 404c, 404d based on the received PMIs.

In FIG. 5A, at 508, the base station may assign a transmission scheme to each UE group. In one aspect, the transmission scheme of the first UE group being assigned based on the one or more spatial layers determined for each UE assigned to the first UE group. In another aspect, the transmission scheme may include an orthogonal transmission scheme when a difference between the first SNR and the second SNR is less than a threshold and a spatial layer set requested by the first and second UEs are not subset of each other. In a further aspect, the transmission scheme may include a non-orthogonal transmission scheme when the difference between the first SNR and the second SNR is greater than a threshold and a spatial layer set requested by the UE with lower SNR is a subset of the spatial layer set requested by the UE with higher SNR. In another aspect, the transmission scheme assigned to a first UE group may include an orthogonal MU-MIMO transmission scheme and the transmission scheme assigned to a second UE group may include a NOMA transmission scheme. For example, referring to FIG. 4, the base station 402 may assign 405 a transmission scheme (e.g., an orthogonal multi-user MIMO transmission scheme and/or a NOMA transmission scheme) to each UE group. UEs 404a, 404c in the first UE group and UEs 404b, 404d in the second UE group may be paired by the base station 402 based on an orthogonal transmission scheme and/or non-orthogonal transmission scheme. The base station 402 may determine an MCS pair for different pairing of UEs in a particular UE group (e.g., when more than two UEs are included in a UE group) to select the best pairing option.

In FIG. 5B, at 510, the base station may schedule a combined transmission for the first UE group based on at least one of the one or more spatial layers or the transmission scheme. For example, referring to FIG. 4, by determining the one or more preferred spatial layers for each UE 404a, 404b, 404c, 404d, the base station 402 may schedule 409 a combined transmission for the particular UE group based on spatial layers covered in the reported PMIs for UEs in the same UE group. To increase a chance of pairing, the base station 402 may use a bitmap (e.g., codebookSubSetRestriction bitmap) to reduce the number of UEs that fall into a particular UE group.

In FIG. 5B, at 512, the base station may schedule a combined transmission for the first UE group by determining a first SNR associated with a first UE in the first UE group and a second SNR associated with a second UE in the first UE group. For example, referring to FIG. 4, assume that the first UE 404a and the third UE 404c both report rank-1 with the same PMI (e.g., PMI1) and the base station 402 determines different SNRs associated with the PMIs sent by the first UE 404*a* and the third UE 404*c*.

In FIG. 5B, at 514, the base station may schedule a combined transmission for the first UE group by determining a power ratio for the combined transmission. For example, referring to FIG. 4, the base station 402 may determine a power ratio of the combined transmission for the first UE 404*a* and the third UE 404*c*.

In FIG. 5B, at 516, the base station may schedule a combined transmission for the first UE group by determining a third SNR associated with a first MCS for the first UE in the combined transmission. For example, referring to FIG. 4, the SNR of the first UE 404*a* may be adjusted by the base station 402 to reflect the power loss to the third UE 404*c*, while the extra interference from the third UE 404*c* may not need to be considered due to interference cancellation.

In FIG. 5B, at 518, the base station may determine a fourth SNR associated with a second MCS for the second UE in the combined transmission. For example, referring to FIG. 4, given a power ratio for the MUST pairing, the SNR of the third UE 404*c* may be adjusted by the base station 402 to reflect the power loss to the first UE 404*a*, and the extra interference from the first UE 404*a*.

In FIG. 5B, at 520, the base station may transmit the combined transmission to the first UE group. In one aspect, the combined transmission may be based at least in part on the transmission scheme assigned to the first UE group. For example, referring to FIG. 4, base station 402 may send a first combined transmission 411*a* to the first UE 404*a* and the third UE 404*c* (e.g., the two UEs paired in the first UE group). In another aspect, base station 402 may send a second combined transmission 411*b* to the second UE 404*b* and the fourth UE 404*d* (e.g., the two UEs paired in the first UE group).

Figure 6:
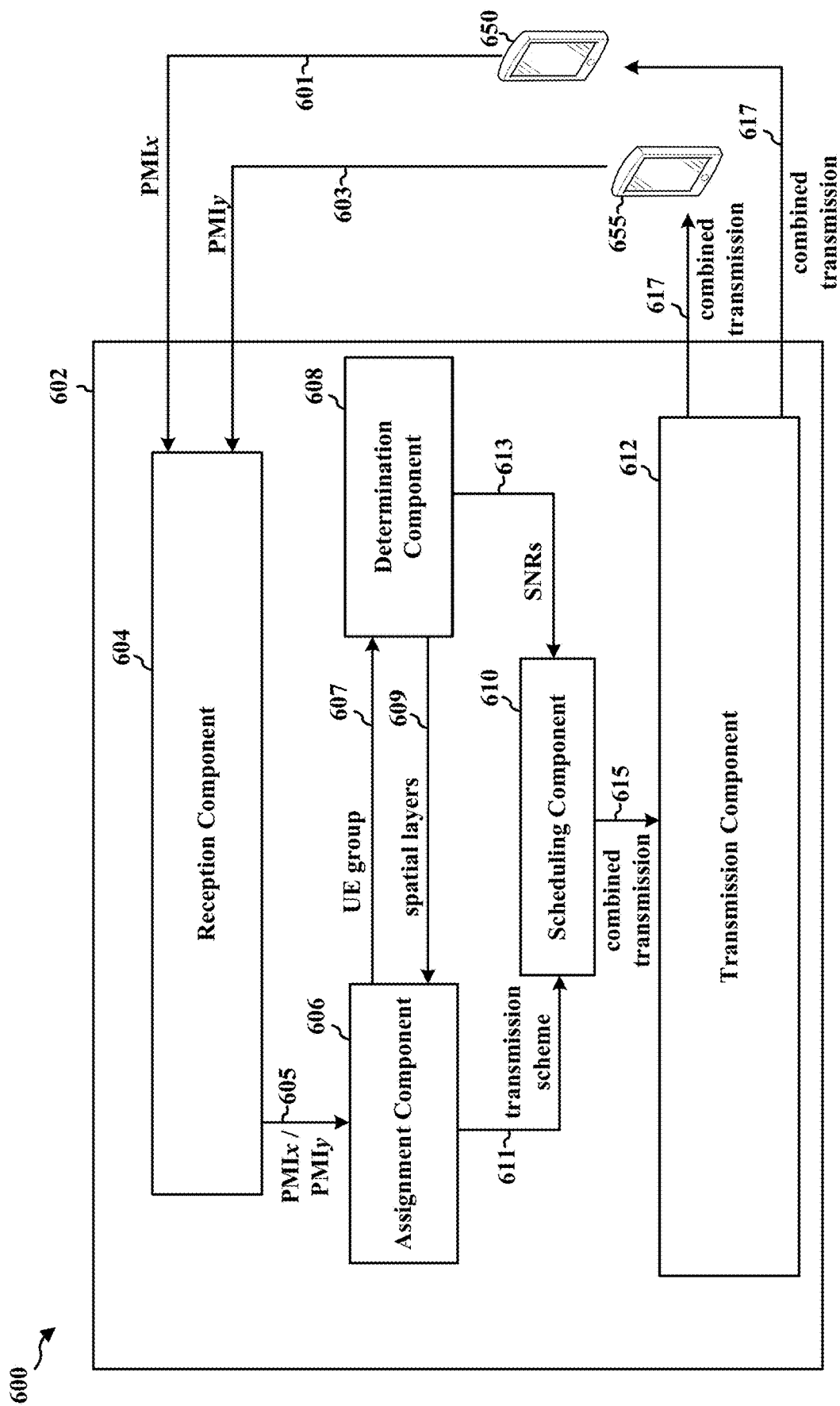
FIG. 6 is a conceptual data flow diagram illustrating the data flow between different means/components in an exemplary apparatus.

FIG. 6 is a conceptual data flow diagram 600 illustrating the data flow between different means/components in an exemplary apparatus 602. The apparatus may be a base station (e.g., the base station 102, 180, eNB 310, apparatus 602') in communication with a first UE 650 (e.g., the UE 104, 350, 404*a*, 404*b*, 404*c*, 404*d*) and a second UE 655 (e.g., the UE 104, 350, 404*a*, 404*b*, 404*c*, 404*d*). The apparatus may include a reception component 604, an assignment component 606, a determination component 608, a scheduling component 610, and/or a transmission component 612. The reception component 604 may receive a plurality of PMIs (e.g., PMIx 601 and PMIy 603) from a plurality of UEs (e.g., first UE 650 and second UE 655). In one aspect, each PMI in the plurality of PMIs may be received from a different UE (e.g., first UE 650 and second UE 655). The reception component 604 may send a signal 605 associated with one or more of PMIx and/or PMIy to the assignment component 606. In one aspect, the assignment component 606 may assign each of the first UE 650 and the second UE 655 to a UE group. In one aspect, each UE group may be associated with a different PMI set in a plurality of PMI sets. In another aspect, the PMI sets may be associated with a structure of one or more precoding matrices. In a further aspect, the structure may include an orthogonality of the one or more precoding matrices. In yet another aspect, the plurality of PMI sets may be determined based on a priori information (e.g., predetermined information). In addition, the assignment component 606 may send a signal 607 associated with one or more of the UEs and/or the UE groups to the determination component 608. Determination component 608 may determine one or more spatial layers for each UE (e.g., first UE 650 and second UE 655) assigned to a first UE group. In one aspect, the transmission scheme of the first UE group may be assigned based on the one or more spatial layers determined for each UE assigned to the first UE group. In addition, the determination component 608 may send a signal 609 associated with the spatial layers to the assignment component 606. Further, the determination component 608 may determine a first SNR associated with the first UE 650 in the first UE group and a second SNR associated with the second UE 655 in the first UE group. In addition, the determination component 608 may determine a power ratio for a combined transmission. Further, the determination component 608 may determine a third SNR associated with a first MCS for the first UE 650 in the combined transmission. Still further, the determination component 608 may determine a fourth SNR associated with a second MCS for the second UE 655 in the combined transmission. The determination component 608 may send a signal 613 associated with one or more of the first SNR, the second SNR, the third SNR, and/or the fourth SNR to scheduling component to scheduling component. The assignment component 606 may assign a transmission scheme to each UE group. In one aspect, the transmission scheme assigned to each UE group may be associated with the spatial layers determined for each of the UEs in the UE group. In another aspect, the transmission scheme may include an orthogonal transmission scheme when a difference between the first SNR and the second SNR is less than a threshold and a spatial layer set requested by the first and second UEs are not subset of each other. In a further aspect, the transmission scheme may include a non-orthogonal transmission scheme when the difference between the first SNR and the second SNR is greater than a threshold and a spatial layer set requested by the UE with lower SNR is a subset of the spatial layer set requested by the UE with higher SNR. In still another aspect, the transmission scheme assigned to a first UE group may include an orthogonal MU-MIMO transmission scheme and the transmission scheme assigned to a second UE group may include a NOMA transmission scheme. In addition, the assignment component 606 may send a signal 611 associated with the transmission scheme assigned to each UE group to the scheduling component 610. The scheduling component 610 may schedule a combined transmission for the first UE group based on at least one of the one or more spatial layers or the transmission scheme. In one aspect, the scheduling component 610 may send a signal 615 associated with the combined transmission to transmission component 612. The transmission component 612 may send the combined transmission 617 to the first UE group (e.g., first UE 650 and second UE 655). In one aspect, the combined transmission may be based at least in part on the transmission scheme assigned to the first UE group.

The apparatus may include additional components that perform each of the blocks of the algorithm in the aforementioned flowcharts of FIGS. 5A and 5B. As such, each block in the aforementioned flowcharts of FIGS. 5A and 5B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 7:
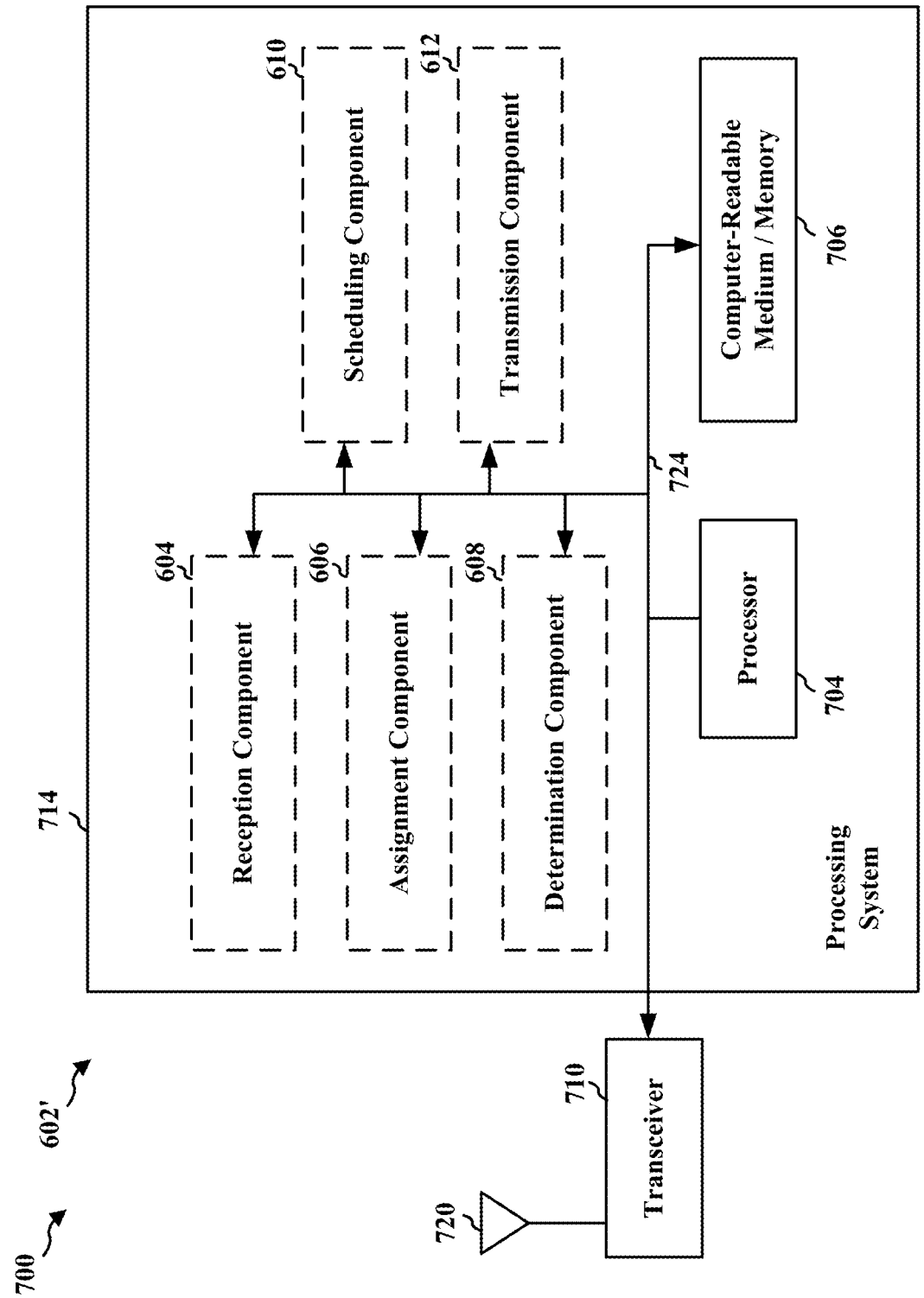
FIG. 7 is a diagram illustrating an example of a hardware implementation for an apparatus employing a processing system.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware components, represented by the processor 704, the components 604, 606, 608, 610, 612 and the computer-readable medium/memory 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The transceiver 710 receives a signal from the one or more antennas 720, extracts information from the received signal, and provides the extracted information to the processing system 714, specifically the reception component 604. In addition, the transceiver 710 receives information from the processing system 714, specifically the transmission component 612, and based on the received information, generates a signal to be applied to the one or more antennas 720. The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 further includes at least one of the components 604, 606, 608, 610, 612. The components may be software components running in the processor 704, resident/stored in the computer readable medium/memory 706, one or more hardware components coupled to the processor 704, or some combination thereof. The processing system 714 may be a component of the base station 310 and may include the memory 376 and/or at least one of the TX processor 316, the RX processor 370, and the controller/processor 375.

In one configuration, the apparatus 602/602' for wireless communication may include means for receiving a plurality of PMIs from a plurality of UEs. In one aspect, each PMI in the plurality of PMIs may be received from a different UE. In another configuration, the apparatus 602/602' for wireless communication may include means for assigning each of the plurality of UEs to a UE group. In one aspect, each UE group may be associated with a different PMI set in a plurality of PMI sets. In another aspect, the PMI sets may be associated with a structure of one or more precoding matrices. In a further aspect, the structure may include an orthogonality of the one or more precoding matrices. In yet another aspect, the plurality of PMI sets may be determined based on a priori information (e.g., predetermined information). In one configuration, the apparatus 602/602' for wireless communication may include means for determining one or more spatial layers for each UE assigned to a first UE group. In one aspect, the transmission scheme of the first UE group may be assigned based on the one or more spatial layers determined for each UE assigned to the first UE group. In another configuration, the apparatus 602/602' for wireless communication may include means for determining a first SNR associated with the first UE in the first UE group and a second SNR associated with the second UE in the first UE group. In a further configuration, the apparatus 602/602' for wireless communication may include means for determining a power ratio for a combined transmission. In one configuration, the apparatus 602/602' for wireless communication may include means for determining a third SNR associated with a first MCS for the first UE in the combined transmission. In another configuration, the apparatus 602/602' for wireless communication may include means for determining a fourth SNR associated with a second MCS for the second UE in the combined transmission. In a further configuration, the apparatus 602/602' for wireless communication may include means for assigning a transmission scheme to each UE group. In one aspect, the transmission scheme assigned to each UE group may be associated with the spatial layers determined for each of the UEs in the UE group. In another aspect, the transmission scheme may include an orthogonal transmission scheme when a difference between the first SNR and the second SNR is less than a threshold and a spatial layer set requested by the first and second UEs are not subset of each other. In a further aspect, the transmission scheme may include a non-orthogonal transmission scheme when the difference between the first SNR and the second SNR is greater than a threshold and a spatial layer set requested by the UE with lower SNR is a subset of the spatial layer set requested by the UE with higher SNR. In still another aspect, the transmission scheme assigned to a first UE group includes an orthogonal MU-MIMO transmission scheme and the transmission scheme assigned to a second UE group includes a NOMA transmission scheme. In one configuration, the apparatus 602/602' for wireless communication may include means for scheduling a combined transmission for the first UE group based on at least one of the one or more spatial layers or the transmission scheme. In one configuration, the apparatus 602/602' for wireless communication may include means for transmitting the combined transmission to the first UE group. In one aspect, the combined transmission may be based at least in part on the transmission scheme assigned to the first UE group. The aforementioned means may be one or more of the aforementioned components of the apparatus 602 and/or the processing system 714 of the apparatus 602' configured to perform the functions recited by the aforementioned means. As described supra, the processing system 714 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, comprising:
receiving a plurality of precoding matrix indicators (PMIs) from a plurality of user equipment (UEs), each PMI in the plurality of PMIs being received from a different UE;
determining, at the base station, a categorization of PMIs into a plurality of PMI sets, wherein the plurality of PMI sets comprise a first PMI set that includes at least a first PMI and a second PMI that is different than the first PMI, wherein the second PMI is categorized into the first PMI set with the first PMI based on the second PMI being a column permutation of the first PMI;
assigning each UE of the plurality of UEs to a UE group based on at least one PMI received from a corresponding UE, each UE group being associated with a different PMI set in the plurality of PMI sets, wherein at least one UE is assigned to a first UE group associated with the first PMI set that includes at least the first PMI and the second PMI;
assigning a transmission scheme to each UE group; and
transmitting a combined transmission to the first UE group associated with the first PMI set, the combined transmission being based at least in part on the transmission scheme assigned to the first UE group.

2. The method of claim 1, wherein the plurality of PMI sets are associated with a structure of one or more precoding matrices, and wherein the structure includes an orthogonality of the one or more precoding matrices.

3. The method of claim 1, further comprising:
determining one or more spatial layers for each UE assigned to the first UE group, the transmission scheme of the first UE group being assigned based on the one or more spatial layers determined for each UE assigned to the first UE group; and scheduling the combined transmission for the first UE group based on at least one of the one or more spatial layers or the transmission scheme.

4. The method of claim 3, wherein the scheduling the combined transmission for the first UE group comprises:
determining a first signal-to-noise ratio (SNR) associated with a first UE in the first UE group and a second SNR associated with a second UE in the first UE group;
determining a power ratio for the combined transmission;
determining a third SNR associated with a first modulation and coding scheme (MCS) for the first UE in the combined transmission; and
determining a fourth SNR associated with a second MCS for the second UE in the combined transmission.

5. The method of claim 4, wherein the transmission scheme includes an orthogonal transmission scheme when a difference between the first SNR and the second SNR is less than a threshold and a spatial layer set requested by the first and second UEs are not a subset of each other.

6. The method of claim 4, wherein the transmission scheme includes a non-orthogonal transmission scheme when the difference between the first SNR and the second SNR is greater than a threshold and a spatial layer set requested by the UE with lower SNR is a subset of the spatial layer set requested by the UE with higher SNR.

7. The method of claim 1, wherein the transmission scheme assigned to a first UE group includes an orthogonal multi-user multiple-input multiple-output (MIMO) transmission scheme and the transmission scheme assigned to a second UE group includes a non-orthogonal multiple access (NOMA) transmission scheme.

8. The method of claim 1, wherein the plurality of PMI sets are determined based on predetermined information.

9. The method of claim 1, wherein the receiving the plurality of PMIs comprises receiving the first PMI from a first UE and the second PMI from a second UE, and wherein the assigning each UE of the plurality of UEs to a UE group comprises assigning the first UE and the second UE to the first UE group associated with the first PMI set.

10. The method of claim 1, wherein the base station selects between an orthogonal multi-user multiple-input multiple-output (MIMO) transmission scheme and a non-orthogonal multiple access (NOMA) transmission scheme in assigning the transmission scheme to each UE group.

11. An apparatus for wireless communication at a base station, comprising:
a memory; and
at least one processor coupled to the memory and configured to:
receive a plurality of precoding matrix indicators (PMIs) from a plurality of user equipment (UEs), each PMI in the plurality of PMIs being received from a different UE;
determine, at the base station, a categorization of PMIs into a plurality of PMI sets, wherein the plurality of PMI sets comprise a first PMI set that includes at least a first PMI and a second PMI that is different than the first PMI, wherein the second PMI is categorized into the first PMI set with the first PMI based on the second PMI being a column permutation of the first PMI;
assign each UE of the plurality of UEs to a UE group based on at least one PMI received from a corresponding UE, each UE group being associated with a different PMI set in the plurality of PMI sets, wherein at least one UE is assigned to a first UE group associated with the first PMI set that includes at least the first PMI and the second PMI;
assign a transmission scheme to each UE group; and
transmit a combined transmission to the first UE group associated with the first PMI set, the combined transmission being based at least in part on the transmission scheme assigned to the first UE group.

12. The apparatus of claim 11, wherein the plurality of PMI sets are associated with a structure of one or more preceding matrices, and wherein the structure includes an orthogonality of the one or more precoding matrices.

13. The apparatus of claim 11, wherein the at least one processor is further configured to:
determine one or more spatial layers for each UE assigned to the first UE group, the transmission scheme of the first UE group being assigned based on the one or more spatial layers determined for each UE assigned to the first UE group; and
schedule the combined transmission for the first UE group based on at least one of the one or more spatial layers or the transmission scheme.

14. The apparatus of claim 13, wherein the at least one processor is configured to schedule the combined transmission for the first UE group by:
determining a first signal-to-noise ratio (SNR) associated with a first UE in the first UE group and a second SNR associated with a second UE in the first UE group;
determining a power ratio for the combined transmission;
determining a third SNR associated with a first modulation and coding scheme (MCS) for the first UE in the combined transmission; and
determining a fourth SNR associated with a second MCS for the second UE in the combined transmission.

15. The apparatus of claim 14, wherein the transmission scheme includes an orthogonal transmission scheme when a difference between the first SNR and the second SNR is less than a threshold and a spatial layer set requested by the first and second UEs are not a subset of each other.

16. The apparatus of claim 14, wherein the transmission scheme includes a non-orthogonal transmission scheme when the difference between the first SNR and the second SNR is greater than a threshold and a spatial layer set requested by the UE with lower SNR is a subset of the spatial layer set requested by the UE with higher SNR.

17. The apparatus of claim 11, wherein the transmission scheme assigned to a first UE group includes an orthogonal multi-user multiple-input multiple-output (MIMO) transmission scheme and the transmission scheme assigned to a second UE group includes a non-orthogonal multiple access (NOMA) transmission scheme.

18. The apparatus of claim 11, wherein the plurality of PMI sets are determined based on predetermined information.

19. An apparatus for wireless communication at a base station, comprising:
means for receiving a plurality of precoding matrix indicators (PMIs) from a plurality of user equipment (UEs), each PMI in the plurality of PMIs being received from a different UE;
means for determining, at the base station, a categorization of PMIs into a plurality of PMI sets, wherein the plurality of PMI sets comprise a first PMI set that includes at least a first PMI and a second PMI that is different than the first PMI, wherein the second PMI is categorized into the first PMI set with the first PMI based on the second PMI being a column permutation of the first PMI;
means for assigning each UE of the plurality of UEs to a UE group based on at least one PMI received from a corresponding UE, each UE group being associated with a different PMI set in the plurality of PMI sets, wherein at least one UE is assigned to a first UE group associated with the first PMI set that includes at least the first PMI and the second PMI;
means for assigning a transmission scheme to each UE group; and
means for transmitting a combined transmission to the first UE group associated with the first PMI set, the combined transmission being based at least in part on the transmission scheme assigned to the first UE group.

20. The apparatus of claim 19, wherein the plurality of PMI sets are associated with a structure of one or more precoding matrices, and wherein the structure includes an orthogonality of the one or more precoding matrices.

21. The apparatus of claim 19, further comprising:
means for determining one or more spatial layers for each UE assigned to the first UE group, the transmission scheme of the first UE group being assigned based on the one or more spatial layers determined for each UE assigned to the first UE group; and
means for scheduling the combined transmission for the first UE group based on at least one of the one or more spatial layers or the transmission scheme.

22. The apparatus of claim 21, wherein the means for scheduling the combined transmission for the first UE group is configured to:
determine a first signal-to-noise ratio (SNR) associated with a first UE in the first UE group and a second SNR associated with a second UE in the first UE group;
determine a power ratio for the combined transmission;
determine a third SNR associated with a first modulation and coding scheme (MCS) for the first UE in the combined transmission; and
determine a fourth SNR associated with a second MCS for the second UE in the combined transmission.

23. The apparatus of claim 22, wherein the transmission scheme includes an orthogonal transmission scheme when a difference between the first SNR and the second SNR is less than a threshold and a spatial layer set requested by the first and second UEs are not a subset of each other.

24. The apparatus of claim 22, wherein the transmission scheme includes a non-orthogonal transmission scheme when the difference between the first SNR and the second SNR is greater than a threshold and a spatial layer set requested by the UE with lower SNR is a subset of the spatial layer set requested by the UE with higher SNR.

25. The apparatus of claim 19, wherein the transmission scheme assigned to a first UE group includes an orthogonal multi-user multiple-input multiple-output (MIMO) transmission scheme and the transmission scheme assigned to a second UE group includes a non-orthogonal multiple access (NOMA) transmission scheme.

26. The apparatus of claim 19, wherein the plurality of PMI sets are determined based on predetermined information.

27. A non-transitory computer-readable medium storing computer executable code for wireless communication at a base station, comprising code to:
receive a plurality of precoding matrix indicators (PMIs) from a plurality of user equipment (UEs), each PMI in the plurality of PMIs being received from a different UE;
determine, at the base station, a categorization of PMIs into a plurality of PMI sets, wherein the plurality of PMI sets comprise a first PMI set that includes at least a first PMI and a second PMI that is different than the first PMI, wherein the second PMI is categorized into the first PMI set with the first PMI based on the second PMI being a column permutation of the first PMI;

assign each UE of the plurality of UEs to a UE group based on at least one PMI received from a corresponding UE, each UE group being associated with a different PMI set in the plurality of PMI sets, wherein at least one UE is assigned to a first UE group associated with the first PMI set that includes at least the first PMI and the second PMI;

assign a transmission scheme to each UE group; and transmit a combined transmission to the first UE group associated with the first PMI set, the combined transmission being based at least in part on the transmission scheme assigned to the first UE group.

28. The non-transitory computer-readable medium of claim 27, wherein the plurality of PMI sets are associated with a structure of one or more precoding matrices, and wherein the structure includes an orthogonality of the one or more preceding matrices.

29. The non-transitory computer-readable medium of claim 27, further comprising code to:

determine one or more spatial layers for each UE assigned to the first UE group, the transmission scheme of the first UE group being assigned based on the one or more spatial layers determined for each UE assigned to the first UE group; and schedule the combined transmission for the first UE group based on at least one of the one or more spatial layers or the transmission scheme.

30. The non-transitory computer-readable medium of claim 29, wherein the code to schedule the combined transmission for the first UE group is configured to:

determine a first signal-to-noise ratio (SNR) associated with a first UE in the first UE group and a second SNR associated with a second UE in the first UE group;

determine a power ratio for the combined transmission;

determine a third SNR associated with a first modulation and coding scheme (MCS) for the first UE in the combined transmission; and determine a fourth SNR associated with a second MCS for the second UE in the combined transmission.

31. The non-transitory computer-readable medium of claim 30, wherein the transmission scheme includes an orthogonal transmission scheme when a difference between the first SNR and the second SNR is less than a threshold and a spatial layer set requested by the first and second UEs are not a subset of each other.

32. The non-transitory computer-readable medium of claim 30, wherein the transmission scheme includes a non-orthogonal transmission scheme when the difference between the first SNR and the second SNR is greater than a threshold and a spatial layer set requested by the UE with lower SNR is a subset of the spatial layer set requested by the UE with higher SNR.

\* \* \* \* \*